Figure 1:
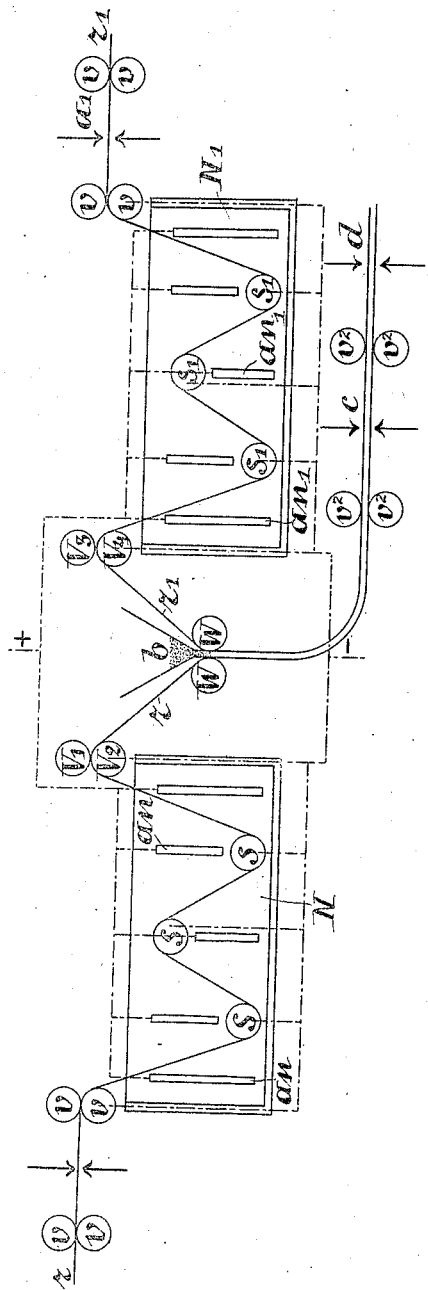

No. 836,261. PATENTED NOV. 20, 1906.
E. W. JUNGNER.
MANUFACTURING ELECTRODES FOR ELECTRICAL ACCUMULATORS BY MEANS OF CONTINUALLY WORKING MACHINES.
APPLICATION FILED SEPT. 11, 1905.

4 SHEETS—SHEET 1.

Witnesses.
H. L. Amer.
R. M. Sommers

Inventor:
Ernst Waldemar Jungner
by Henry Orth, Atty.

No. 836,261. PATENTED NOV. 20, 1906.
E. W. JUNGNER.
MANUFACTURING ELECTRODES FOR ELECTRICAL ACCUMULATORS BY MEANS
OF CONTINUALLY WORKING MACHINES.
APPLICATION FILED SEPT. 11, 1905.
4 SHEETS—SHEET 2.
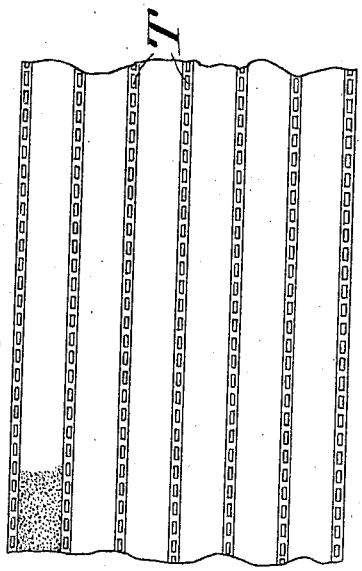
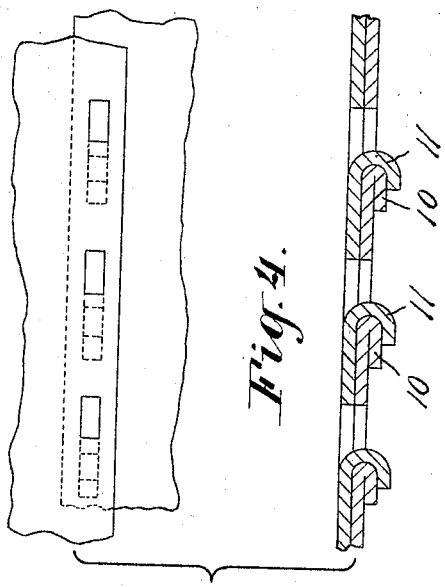
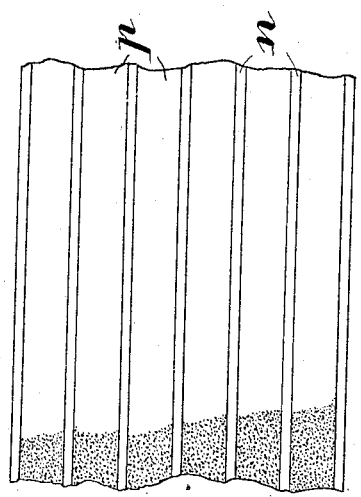
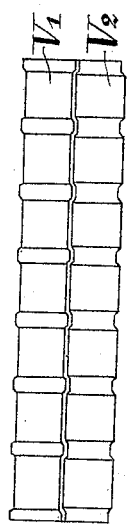
Witnesses.
H. L. Amer.
B. Dommers
Inventor.
Ernst Waldemar Jungner,
by Henry Orth Atty.

No. 836,261. PATENTED NOV. 20, 1906.
E. W. JUNGNER.
MANUFACTURING ELECTRODES FOR ELECTRICAL ACCUMULATORS BY MEANS OF CONTINUALLY WORKING MACHINES.
APPLICATION FILED SEPT. 11, 1905.
4 SHEETS—SHEET 3.
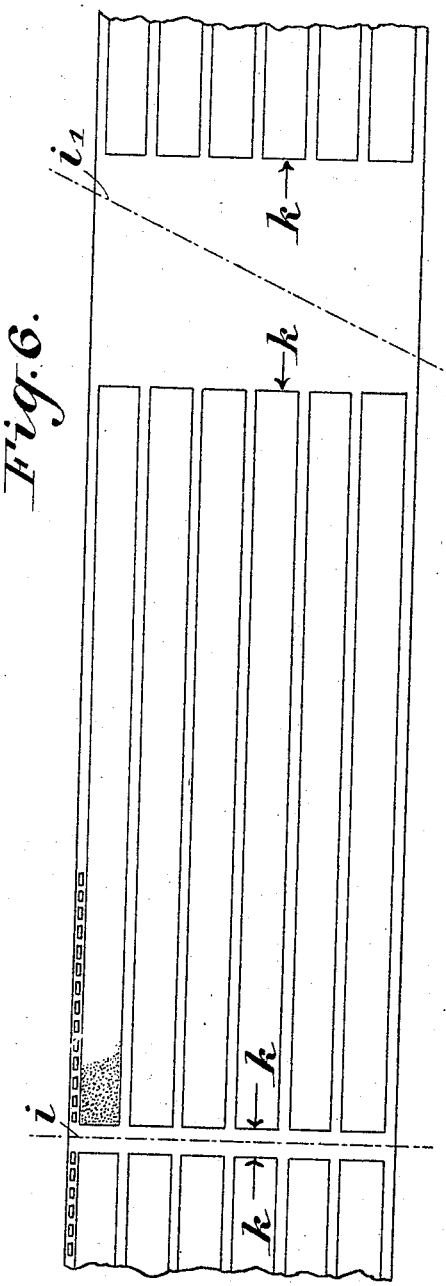
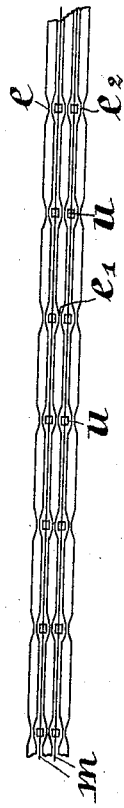
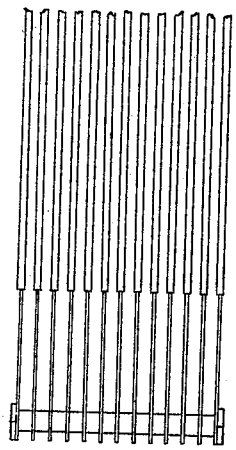
Witnesses.
H. L. Amer.
R. W. Sommers
Inventor.
Ernst Waldemar Jungner.
by Henry Orth
Atty.

No. 836,261. PATENTED NOV. 20, 1906.
E. W. JUNGNER.
MANUFACTURING ELECTRODES FOR ELECTRICAL ACCUMULATORS BY MEANS OF CONTINUALLY WORKING MACHINES.
APPLICATION FILED SEPT. 11, 1905.
4 SHEETS—SHEET 4.
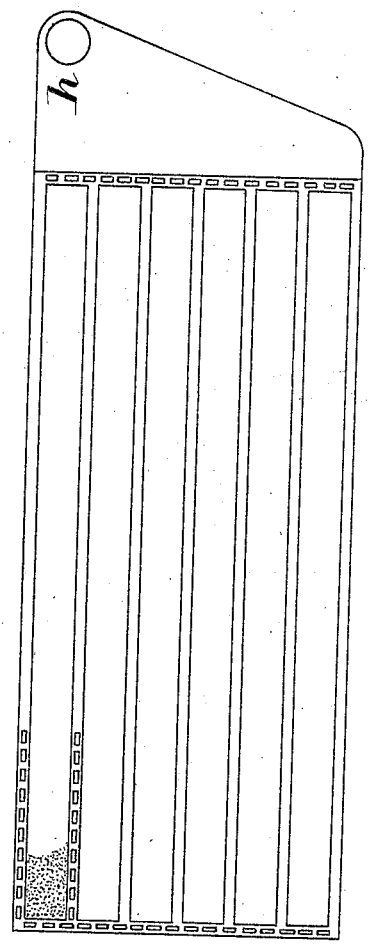
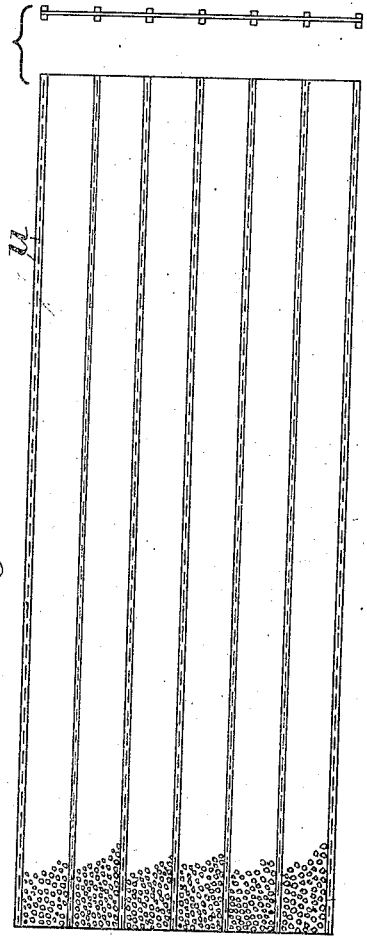
Witnesses.
H. L. Amer,
Inventor.
Ernst Waldemar Jungner,
by Henry Orth
atty.

UNITED STATES PATENT OFFICE.

ERNST WALDEMAR JUNGNER, OF KNEIPPBADEN, SWEDEN, ASSIGNOR TO NYA ACKUMULATOR-AKTIEBOLAGET JUNGNER, OF STOCKHOLM, SWEDEN, A COMPANY.

MANUFACTURING ELECTRODES FOR ELECTRICAL ACCUMULATORS BY MEANS OF CONTINUALLY-WORKING MACHINES.

No. 836,261.      Specification of Letters Patent.      Patented Nov. 20, 1906.

Application filed September 11, 1905. Serial No. 277,986.

*To all whom it may concern:*

Be it known that I, ERNST WALDEMAR JUNGNER, a subject of the King of Sweden and Norway, residing at Kneippbaden, Sweden, have invented certain new and useful Improvements in Manufacturing Electrodes for Electrical Accumulators by Means of Continually-Working Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to the manufacture of electrodes, and has for its object to automatically and mechanically assemble the parts of the electrodes with their active masses to produce an electrode as thin as possible with the least quantity of metallic carrier and at the same time reduce the cost of manufacture.

The present invention relates more particularly to the method of making such electrodes, especially those designed for use in alkaline electrolytes, though electrodes for use with other electrolytes may be made by the same process.

In the drawings I have diagrammatically shown the machine for carrying out the process, the specific elements of which machine are known, and I have illustrated the resulting product at the several stages or steps of the process.

Referring to said drawings, in which like parts are similarly designated, Figure 1 is a diagrammatic view of the machine for carrying out my invention. Fig. 2 is a view illustrating the ribbon from which the carriers are to be made at the first stage of manufacture, having perforated and imperforated fields. Fig. 3 illustrates the rollers for grooving the strip. Fig. 4 illustrates one method of locking opposite carrier-plates together. Fig. 5 shows two carrier-plates sewed together by a wire, the lines of stitching being along the imperforate portions of the plate. Fig. 6 indicates the manner of severing the electrodes from the strip. Fig. 7 illustrates one form of finished electrode. Fig. 8 illustrates a group of such forming one pole of an accumulator. Fig. 9 illustrates a separator for adjacent electrodes. Fig. 10 illustrates the assembled electrodes with the insulating layers or sheets between them.

The inactive carriers for the active masses are made as light as possible to maintain the proper degree of rigidity, hardness, and conductivity, and to this end I make them of metal—such as copper, nickel, iron, and the like—and use such rolled into thin foil or comparatively wide ribbons, (one hundred and fifty millimeters or more,) and they may be of unlimited length, this condition rendering possible the making of electrodes by the present method of procedure. These thin ribbons $r$ and $r_1$ are fed from opposite sides of the apparatus, Fig. 1, by means of feed-rollers $v$, there being two pairs of feed-rollers at each side of the machine, as shown in Fig. 1, for the independent ribbons; but I do not limit myself to such number, as they may be provided wherever found necessary in the course of the ribbons through the apparatus.

Between the pairs of feed-rollers at the sides of the machine, at the points marked $a$ and $a_1$, I perforate the ribbons by means of any suitable perforating-machine, so that the ribbon will be perforated into, preferably, but not necessarily, longitudinal parallel fields $p$, Fig. 2, separated by imperforate portions $n$.

If the ribbons are not made of nickel or an alloy containing nickel, in order to render them insoluble in the electrolyte they must be coated with a metal that is insoluble in the electrolyte, and to this end each perforated ribbon or foil is run through an electroplating-tank $N$ and $N_1$ and made the cathode thereof, and this I do by passing the ribbon foil over rollers $s$ and $s_1$, arranged zigzag in the tanks, and suspending suitable anodes $an$ and $an_1$ between and among the rollers so as not to be touched by the ribbons in their pasage through the tanks.

The anodes are all connected to the positive pole of a suitable source of electricity, while the metal guide-rollers $s$ $s_1$, the lower roller $v$ of the second pair of such rollers, and the rolls $V_2$ and $V_4$, to be described, are all connected to the negative pole of said source of electricity, thereby causing the ribbon running over them to act as cathode.

On leaving the tanks $N$ and $N_1$ the ribbon $r$ passes between rolls $V_1$ and $V_2$ and the ribbon $r_1$ between rolls $V_3$ and $V_4$, which are shaped substantially as shown in Fig. 3, whereby the coöperating flanges or channels of these rolls engage and shape the imperforate fields $n$ of the ribbon, which are corrugated longitudinally by said rolls. The two ribbons are then brought down between the two rolls W W sufficiently distanced from each other to produce an electrode of the desired thickness, thereby allowing spaces between oppositely-situated and adjacent perforated fields $p$. As the ribbons feed to and between the rolls W the active material is also fed between the ribbons $r$ and $r_1$ from any suitable mechanism (shown diagrammatically) as from a hopper $b$, through which hopper the active mass is constantly forced and is compressed between the carriers. Any suitable mechanism for feeding the active mass may be used.

After leaving the rolls W the two strips, with the active mass between them, are guided between guide-rolls $v_2$, two pairs of which are shown, and the ribbons are united along the imperforate fields $n$ at the point $c$, Fig. 1. This may be done either by sewing with a suitable thread or with a wire of nickel or by means of rivets. Another suitable way is shown in Fig. 4, where square or rectangular laps are punched from one ribbon and folded each upon itself, as shown at 10, and similar laps 11, punched from the other ribbon, pass through the holes and fold over the laps on the first ribbon.

If sewing is resorted to, the ribbons will have the appearance shown in Fig. 5, where the "sewing-holes" are indicated by T.

In a continuous ribbon it is of course necessary to interrupt the feed of active material, the perforating, and the uniting or sewing at intervals to form the separate electrodes. The united ribbons have the appearance illustrated in Fig. 6, where the spaces $k$ are not perforated and do not include active mass between them.

At $d$, Fig. 1, the separate electrodes are cut off along the lines $i$ and $i_1$, Fig. 6.

The electrode-ribbons are united or sewed together transversely, as shown in Fig. 7. This may be an independent operation, or it may be performed by suitable machinery timed to coöperate with the other machines in the path of the ribbon.

A hole $h$, Fig. 7, is stamped in each electrode, so that electrodes of the same kind can be threaded on nickel-plated cylinders and spaced by nickel-plated metal rings and screwed together to form one set of plates or pole of the battery, as shown in Fig. 8.

The best and perhaps only possible method of effectively insulating the electrodes from each other with a minimum distance between them consists in the use of perforated foils or sheets of insulating material—such as ebonite, mica, and the like—preferably provided with parallel ribs corresponding with and fitting into the depressions in the electrodes when the two ribbons are united.

Such separating and insulating plates are suitably formed by sewing onto the sheet of material $m$, Fig. 10, strips $u$ of like or similar material, three electrodes $e$, $e_1$, and $e_2$, with the insulating material between them, being shown in said Fig. 10. The main advantage of such a system of manufacture is the greatly-reduced cost of the product, and if the active mass of the negative electrodes consists of oxygen compounds of iron, which are comparatively cheap, such electrodes can be produced at a very small cost. This is particularly advantageous, since in accumulators with invariable electrolyte the life of such negative electrodes is less than the other electrodes used in the same kind of battery, so that these electrodes of oxygen compounds of iron must be replaced by others, although at comparatively long intervals.

I am enabled to employ extremely thin metal foil in making the electrodes 0.03 millimeter or less and insert between these thin carriers an even layer of active mass, 0.7 millimeter or less. Said electrodes can therefore be made very thin and be placed very close together, and I thereby obtain an accumulator which at discharge can deliver more energy per unit of time, while maintaining constant tension, than any accumulator heretofore constructed, and, furthermore, while maintaining a higher efficiency can be charged in a very much shorter time.

Since the electrodes are very thin, each particle of active mass will be in good conductive connection with the inactive carriers, so that the absorption and reaction of the mass will approach the theoretical values, while heretofore only sixty per cent. of the theoretical values have been attained, and while the capacity of such accumulator per unit of weight is increased the cost of the material and production per unit of capacity are decreased in a corresponding degree.

Having thus described my invention, what I claim as new therein, and desire to secure by Letters Patent, is—

1. The method of making accumulator-electrodes, which comprises feeding continuous metallic ribbons toward each other, perforating the ribbons, then feeding an active mass between said ribbons and finally uniting the ribbons and severing the electrodes thus formed.

2. The method of making accumulator-electrodes, which comprises feeding continuous metallic ribbons toward each other, perforating the ribbons, electroplating them, feeding an active mass between them and finally uniting the ribbons and severing the electrodes thus formed.

3. The method of making accumulator-electrodes, which comprises feeding continuous metallic ribbons toward means to feed active material, perforating the ribbons in parallel fields separated by imperforate fields, electroplating the ribbons with a metal substantially insoluble in the electrolyte, feeding active material between the perforated plated ribbons, uniting the ribbons along the imperforate fields and severing the electrodes from the continuous united strip, substantially as and for the purpose set forth.

4. The method of making accumulator-electrodes, which comprises feeding continuous metallic ribbons, perforating the ribbons during their travel into parallel perforated fields separated by imperforate fields, forming depressions along the imperforate fields separating the perforated ones, feeding active material between the ribbons, rolling the two ribbons together to compress the active mass and cause the opposite imperforate fields to lie adjacent one another, uniting the ribbons along the imperforate fields and severing the electrodes.

5. The method of making accumulator-electrodes, which comprises feeding continuous metallic ribbons, perforating the ribbons into longitudinal parallel fields separated by imperforate fields, electroplating the perforated ribbons with nickel, forming a depression along the imperforate fields, feeding the ribbons between compression-rollers and simultaneously feeding between the ribbons suitable active material, sewing the ribbons together along the imperforate fields and separating the electrodes from the united ribbon at one end of the electrode by a transverse cut and at the other end by a diagonal cut.

6. The method of making accumulator-electrodes which comprises feeding metallic ribbons toward each other, and feeding active mass between the ribbons during their movement, uniting the ribbons to hold the mass between them and finally severing the electrodes from the continuous strip so formed, substantially as described.

In testimony that I claim the foregoing as my invention I have signed my name in presence of two subscribing witnesses.

ERNST WALDEMAR JUNGNER.

Witnesses:
    FRITHIOF NYLIN,
    SVEN PETERSSEN.